United States Patent [19]
Hudak

[11] Patent Number: 6,034,361
[45] Date of Patent: Mar. 7, 2000

[54] SYSTEM FOR MONITORING THE PROGRESS OF A CHEMICAL REACTION IN A MICROWAVE-ASSISTED HEATING SYSTEM

[75] Inventor: George J. Hudak, Kennett Square, Pa.

[73] Assignee: Hewlett-Packard Company, Palo Alto, Calif.

[21] Appl. No.: 09/300,492

[22] Filed: Apr. 28, 1999

[51] Int. Cl.[7] .................................................. H05B 6/66
[52] U.S. Cl. .......................... 219/702; 219/687; 422/21
[58] Field of Search .................................. 219/702, 687, 219/696, 693, 750; 422/21

[56] References Cited

U.S. PATENT DOCUMENTS

| | | | |
|---|---|---|---|
| 4,671,952 | 6/1987 | Masse | 423/539 |
| 4,988,533 | 1/1991 | Freeman et al. | 427/563 |
| 5,308,944 | 5/1994 | Stone-Elander et al. . | |
| 5,847,355 | 12/1998 | Barmatz et al. | 219/121.59 |

OTHER PUBLICATIONS

G. Majetich and R. Hicks, "The Use Of Microwave Heating To Promote Organic Reastions," Published Nov. 3, 1994, Copyright International Microwave Power Institute.

E.D. Neas & M.J. Collins, "Microwave Heating Theoretical Concepts and Equipment Design," ACS Professional Reference Book "Introduction to Microwave Sample Preparation Theory and Practice," 1998 American Chemical Society, Chapter 2, pp. 7–32.

H.M. Kingston and L.B. Jassie, "Monitoring and Predicting Parameters in Microwave Dissolution," ACS Professional Reference Book "Introduction to Microwave and Sample Preparation Theory and Practice," 1998 American Chemical Society, Chapter 6, pp. 93–154.

Primary Examiner—Teresa Walberg
Assistant Examiner—Jeffrey Pwu

[57] ABSTRACT

A system for monitoring the progress of a chemical reaction in a microwave-assisted preparation of a sample, having a microwave energy source, a waveguide coupled to the microwave energy source and having a waveguide cavity, and a resistive load coupled to the waveguide, wherein the sample that is to be subject to microwave-assisted heating is situated in a reaction vessel. The reaction vessel is located in the path of the forward microwave radiation between the microwave energy source and the resistive load. An energy monitoring device is interposed between the reaction vessel and the resistive load so as to monitor the energy not absorbed by the reaction vessel. The energy absorbed by the sample may be calculated in accordance with the level of energy measured by the energy monitoring device to provide a value that indicates the status of the chemical reaction. Alternatively, the reaction vessel may be located in the path of the forward microwave radiation between the microwave energy source and a terminal end of the waveguide. An isolator provided in the form of a circulator coupled to the resistive load is located in the path of the forward microwave radiation between the microwave energy source and the reaction vessel so as to allow the forward energy to proceed to the sample, and to divert reverse energy to the resistive load. The energy absorbed by the sample may be calculated in accordance with the difference in the levels of energy respectively measured by forward energy and reverse energy monitoring devices.

2 Claims, 2 Drawing Sheets

SYSTEM FOR MONITORING THE PROGRESS OF A CHEMICAL REACTION IN A MICROWAVE-ASSISTED HEATING SYSTEM

FIELD OF THE INVENTION

The present invention relates generally to methods and apparatus for heating one or more constituent components in a sample and, more particularly, to a microwave-assisted heating system for promoting a chemical reaction of interest in a chemical synthesis.

BACKGROUND OF THE INVENTION

It is known in the art to use microwave heating to promote the progress of one or more sample preparation steps or of one or more chemical synthesis steps. For example, microwave heating of chemical reactions in sealed containers to promote an organic reaction was described by Giguere et al., in "The use of microwave ovens for rapid organic synthesis", Tetrahedron Letters 27: 279 (1986). Early studies showed that microwave heating can promote the progress of a chemical reaction and offers a dramatic decrease in reaction time. Those findings stimulated the study of microwave heating, and advances in the field are described in several reviews (such as in Abramovitch, R. A., "Applications Of Microwave Energy in Organic Chemistry, A Review", *Organic Preparations Procedures International* 23:683–711.)

These developments in microwave-assisted synthesis now offer fast synthesis procedures while offering better yields and improved selectivity. Developments in microwave-assisted synthesis and extraction techniques aid in the generation and extraction of complex reaction mixtures. Microwave-assisted synthesis allows fast product generation in high yield under uniform conditions, and is considered to be well suited for performing combinatorial chemistry.

The conventional microwave-assisted heating apparatus typically employs a microwave energy source, usually a magnetron or traveling wave tube source, coupled to a waveguide which serves to guide microwave energy in a forward direction to a container that contains a sample that is to be subjected to microwave-assisted heating.

It is important to monitor the progress of a chemical reaction in a microwave assisted heating system. Without some means for determining the progress of the reaction, the operator may discontinue the progress of the reaction prior to its natural or desired point of completion, or may allow the reaction to progress beyond the desired point whereupon unwanted byproducts or degradation may occur. Typical means for monitoring include thermocouples, temperature probes, pressure probes, and similarly invasive devices, which may not be compatible with an applied microwave field. Proper monitoring of the chemical reaction allows the operator to optimize the time spent on the reaction and improve the overall synthetic yield. Instruments are typically employed for monitoring the state of the chemical reaction by observing the temperature, color, pH, viscosity, and the like of the material subject to the reaction. However, it would be desirable and of considerable advantage to provide an improved, non-invasive system for monitoring the progress of a chemical reaction and a microwave-assisted heating system that offers a more accurate indication of the progress of the chemical reaction.

SUMMARY OF THE INVENTION

In a first preferred embodiment of the present invention, the present invention provides a system for monitoring the progress of a chemical reaction in a microwave-assisted heating, having a microwave energy source, a waveguide coupled to the microwave energy source and having a waveguide cavity, and a resistive load coupled to the waveguide, wherein the sample that is to be subject to microwave-assisted heating is situated in a reaction vessel which in turn is situated in a container subassembly located in the waveguide cavity, and wherein the waveguide geometry is arranged such that the reaction vessel is located at a predetermined position in the path of the forward microwave radiation between the microwave energy source and the resistive load. A directional coupler and an energy monitoring device is interposed between the reaction vessel and the resistive load so as to monitor the energy not absorbed by the reaction vessel. Given that the total level of energy introduced to the waveguide by the microwave energy source is a known (i.e., measurable quantity), the energy absorbed by the sample may be calculated in accordance with the level of energy measured by the energy monitoring device to provide a value that indicates the status of the chemical reaction. For example, as the chemical reaction proceeds from a first stage to a second stage, the level of energy absorbed by the sample will change. This change in absorbed energy level is monitored so as to provide a measure of the progress of the chemical reaction between the first stage and the second stage.

In a second preferred embodiment of the present invention, the waveguide geometry of the system is arranged such that the reaction vessel is located at a predetermined position in the path of the forward microwave radiation between the microwave energy source and a terminal end of the waveguide. An isolator provided in the form of a circulator coupled to the resistive load is located at a predetermined position in the path of the forward microwave radiation between the microwave energy source and the reaction vessel so as to allow the forward energy generated by the energy source to proceed to the sample, and divert reverse energy (i.e., energy reflected from the reaction vessel, the sample, and the terminal end of the waveguide) to the resistive load. Forward energy and reverse energy monitoring devices are interposed between the isolator and the reaction vessel so as measure respective forward energy and reverse energy levels. The energy absorbed by the sample may be calculated in accordance with the difference in the levels of energy measured by the forward energy and reverse energy monitoring devices to provide a value that indicates the status of the chemical reaction.

The contemplated system offers the ability to accurately monitor the progress of a chemical reaction of differing quantities and types of samples by calculating the power absorbed by a sample present in the reaction vessel in accordance with the level of energy measured by the energy monitoring device(s), and is useable without major modifications when such differing quantities or types of samples are to be subjected to microwave-assisted heating.

In an instance wherein the sample contains components that are absorptive of microwave radiation, such as water or other polar molecules, the sample will absorb nearly all of the radiated microwave energy and little of the radiated microwave energy will reach the resistive load. If, however, the sample is generally a poor absorber of microwave energy, the radiated microwave energy will pass through the reaction vessel, which absorbs little or none of the radiated microwave energy, such that the remaining radiated energy reaches the resistive load and is dissipated with an insignificant amount of power reflected back to the microwave energy source.

The user may thus employ contemplated system for effecting controlled microwave-assisted heating of a large number of samples, and may perform the relevant sample preparation steps, chemical synthesis procedures, or the like, in an accurate, simple, and cost-effective manner. These attributes are especially beneficial when the system is used for the type of repetitive heating procedures that are typically performed in one or more chemical analysis or a chemical synthesis applications.

The contemplated system may be constructed to function in a lightweight and portable instrument that can be used in the field without reliance upon the typical attributes of a laboratory. Although the contemplated system may be usefully deployed outside of the laboratory, it nonetheless is amenable to use with any integrated analytical or synthesis instrument, whether that instrument is also field-portable, located in a vehicle, or maintained in a laboratory.

DETAILED DESCRIPTION OF THE PREFERRED EMBODIMENTS

Figure 1:
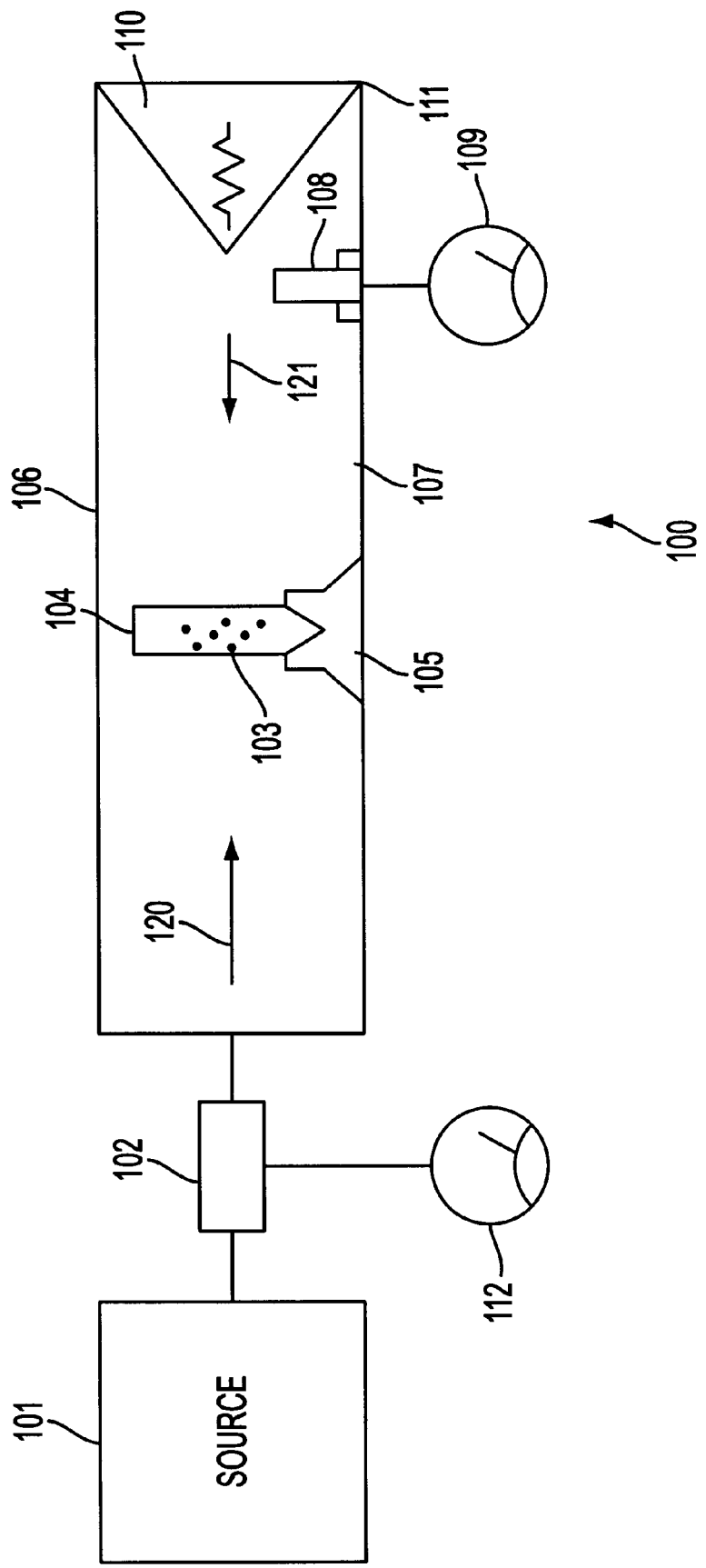
FIG. 1 is a simplified schematic representation of a first preferred embodiment of a system for microwave-assisted heating made in accordance with the present invention and having been preloaded with a reaction vessel having therein a sample that is to be subjected to a chemical reaction by way of a microwave-assisted heating process.

As shown in FIG. 1, a first preferred embodiment of a microwave-assisted heating system 100 may be constructed according to the present invention to include: a microwave energy source 101; a first directional coupler 102 connected between the microwave energy source 101 and a waveguide 106 so as to introduce microwave radiation in a positive, or forward, radiated direction 120 into a waveguide cavity 107; an energy monitoring device 112 connected to the first directional coupler 102 to measure the total power provided to the cavity by the source 101; a sample 103 in a reaction vessel 104, the latter preferably provided in the form of a reaction vessel suitable for use in one or more microwave-assisted chemical synthesis procedures; a container subassembly 105 preferably constructed of material that is substantially transparent to microwave energy, wherein the container subassembly 105 is situated in the cavity 107 so as to locate the reaction vessel 104 at a first predetermined location with respect to the geometry of the waveguide 106; a second directional coupler 108 interposed in the waveguide 106 at a point between the reaction vessel 104 and a resistive load 110 (wherein the resistive load 110 is positioned at a second predetermined location in the waveguide 106 so as to dissipate the forward energy not otherwise absorbed by the combination of the sample 103, reaction vessel 104, and subassembly 105). The second directional coupler 108 is connected to a forward energy monitoring device 109. The combination of the second directional coupler 108 and the forward energy monitoring device 109 allow detection of the forward energy present in the cavity 107 at a point between the reaction vessel 104 and the resistive load 110. The resistive load 110 functions to minimize the return of any microwave energy traveling in a negative, or reverse, radiated direction 121 which otherwise would have been reflected from a terminal end 111 of the waveguide 106. The energy proceeding in the forward radiated direction 120 in the vicinity of the second directional coupler 108 may be understood to be forward radiated energy not otherwise absorbed by the combination of the sample 103, reaction vessel 104, and subassembly 105.

The construction of the waveguide 106 and the location of the associated components heretofore described, which is described herein as the "geometry" of the system 100, is preferably tuned such that the resistive load 110 is matched to the waveguide 106. The location of reaction vessel 104 within the cavity 107 is preferably consistent with a maximum field potential within the waveguide 106.

As a result, the resistive load 110 provides a sufficient load at all times to the microwave energy source 101 so as to promote stable operation of the microwave energy source 101 and to prevent self-destruction of the microwave energy source 101 (which would otherwise occur if the energy source 101 were to be improperly loaded). For example, in an instance wherein the sample 103 contains reactants that are absorptive of microwave radiation, such as water or other polar molecules, the sample 103 will absorb nearly all of the forward-radiated microwave energy traveling in the forward radiated direction 108A and little of the forward-radiated microwave energy will reach the resistive load 110. If, however, the sample 103 is generally a poor absorber of microwave energy and accordingly absorbs little or none of the forward-radiated microwave energy, most of the forward-radiated microwave energy will pass through the reaction vessel 104 and is coupled to the resistive load 110 so as to be dissipated, whereupon an insignificant amount of forward-radiated power can be reflected back in the reverse radiated direction 108B to the microwave energy source 101. As a result, the illustrated embodiment of the contemplated system 100 provides microwave-assisted preparation of a variety of quantities and types of sample without resort to the use of a waveguide isolator.

The power absorbed by the combination of the reaction vessel 104, the subassembly 105, and the sample 103, may be calculated as follows, wherein the sample 103 contains a solvent only, and:

P1=the total power provided to the cavity by the source 101;

P2=the power reflected by the combination of the sample 103, reaction vessel 104, and subassembly 105 in the reverse radiated direction 121;

P3=the power absorbed by the combination of the sample 103, reaction vessel 104, and subassembly 105;

P4=the powered measured by the energy monitoring device 109 (that is, the forward energy present in the cavity 107 at a point between the reaction vessel 104 and the resistive load 110);

and wherein:

P1', P2', P3', P4'=powers measured or absorbed according to respective foregoing descriptions of P1, P2, P3, P4 but with the exception that the sample contains a solvent plus reagents.

Accordingly, one may calculate:

$$P4'=P1'-P2'-P3' \qquad \text{(Eq. 1)}$$

$$P4=P1-P2-P3 \qquad \text{(Eq. 2)}$$

Subtracting equation to from the equation one yields:

$$P4'-P4=(P1'-P1)-(P2'-P2)-(P3'-P3) \qquad \text{(Eq. 3)}$$

To simplify Equation 3, one may recognize that the power reflected from the reaction vessel 104 does not vary according to the presence or absence of a reagent because the quantity of reagent is small compared to the quantity of the solvent. Also, P1 will not vary according to the presence or absence of a reagent. Therefore: (P2'−P2)=approximately zero; and (P1'−P1)=approximately zero. Therefore, equation 3 may be simplified to:

$$P4'-P4=(P1'-P1)-(P3'-P3) \qquad (Eq. 4)$$

and $$P3'=P3-(P4'-P4) \qquad (Eq. 5)$$

P4' and P4 are quantities measured by the energy monitoring device 109; P3 can be measured by a rate study through application of microwave power and temperature measurement and by knowledge of the specific heat and volume of the solvent present in the reaction vessel 104. It is contemplated that P3 is measured over the identical synthesis time and power conditions for the particular reaction of interest. From the foregoing computations, the power absorbed by the sample 103 can be calculated. The absorbed power may be measured as a function of time while the reaction is ongoing (i.e., dynamically) or simply summed to provide a value representative of the total energy absorbed during the reaction.

The foregoing calculations may be simplified further in applications wherein the rate studies to determine P3 are omitted, such that the values for P2, P2', are assumed to cancel, and P3 is considered to be zero. These assumptions lead to a determination of P1' as being set by the measured value of P4 during a condition wherein the reagent is absent.

Those skilled in the art will now realize that, according to the teachings of the present invention, the progress of a chemical reaction may be monitored by measuring the power absorption dynamic indicated by the changing value of P3. Consider, for example, a condition wherein the sample includes a quantity of non-absorbing solvent and a quantity of absorbing reagent. In such a condition, the initial power absorbed by the sample will be a certain value which will be seen to decrease with time it has the absorbing species are converted to non-absorbing species. By way of measurement of the power absorbed by the sample over a period of time, the progress of the reaction can be monitored. A plot of such power absorbed versus time would resemble a declining exponential which decreases as the absorbing species are consumed.

Figure 2:
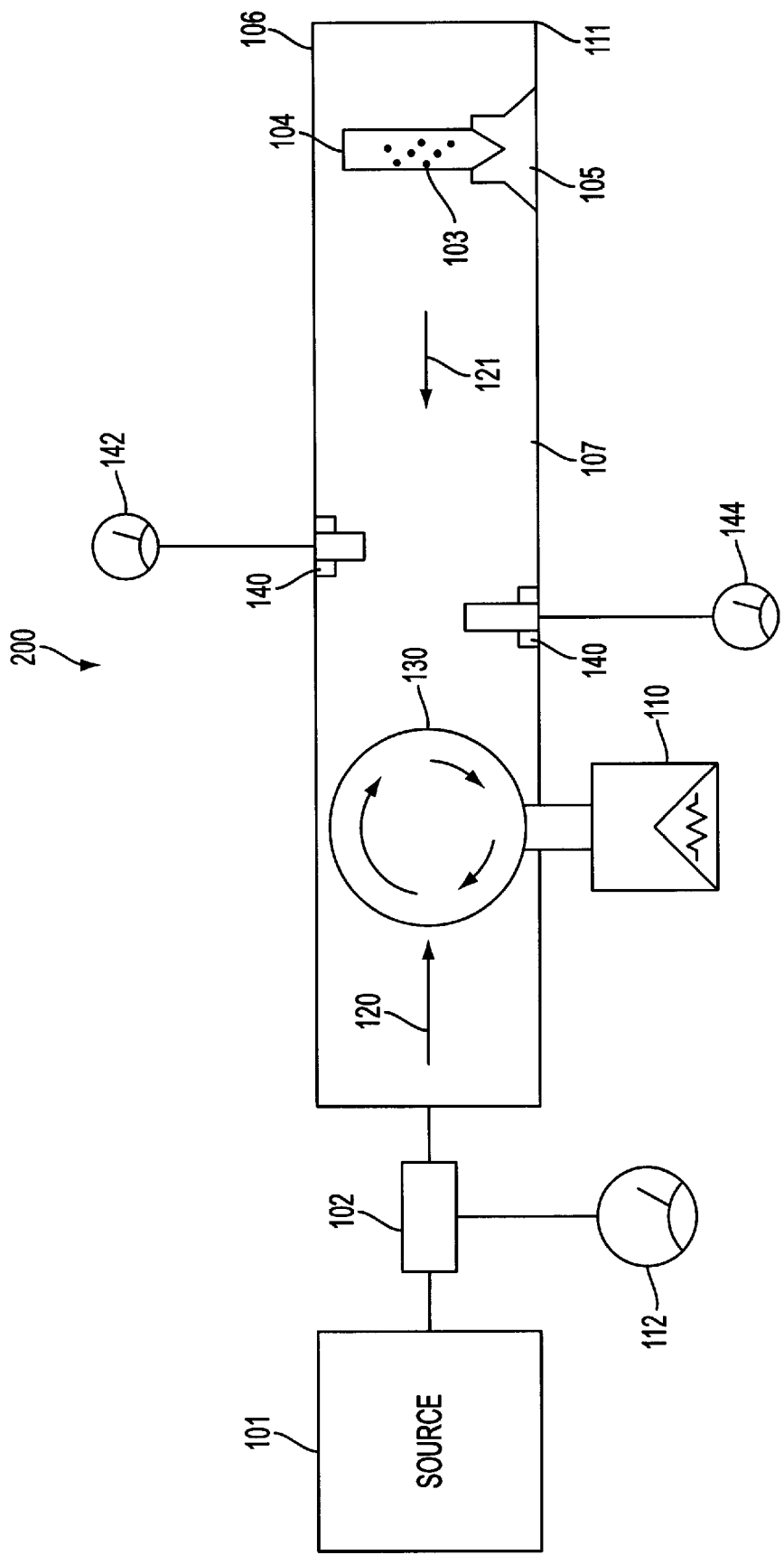
FIG. 2 is a simplified schematic representation of a second preferred embodiment of the system of FIG. 1.

In a condition wherein the solvent is considered to be an energy absorber, the progression of the chemical reaction may be monitored according to measurement of the absorption dynamics of the solvent along as a function of time (e.g., P4 versus time under identical reaction conditions) and comparing the results to the power absorption curved obtained in the presence of reagents. A plot of the value for (P4'−P4) over time will be seen to approach zero at the completion of the reaction. As shown in FIG. 2, a second preferred embodiment 200 of the present invention may be constructed to include an isolator provided in the form of a circulator 130 coupled to the resistive load 110. The circulator 130 is located within the waveguide 106 so as to allow the forward energy 120 generated by the energy source 101 to proceed to the sample 103, and to divert reverse energy 121 (i.e., energy not otherwise absorbed by the reaction vessel 104, the sample 103, the subassembly 105, and the terminal end of the waveguide 111) to the resistive load 110. Directional couplers 140 are interposed between the circulator 130 and the reaction vessel 104 so as to couple the forward and reverse energy present in the vicinity of the directional couplers 140 respectively to a forward energy monitoring device 142 and a reverse energy monitoring device 144. The difference of the values of power measured by the forward energy and reverse energy monitoring devices 142, 144 indicates the energy absorbed by the sample 103.

With respect to the foregoing embodiments, the source 101 may be constructed in the form of a magnetron or a signal generator connected to a traveling wave tube or other amplifier. The waveguide 106 preferably is constructed to include metallic walls that are shaped and configured according to waveguide design considerations known in the art. The cavity 107 may be configured as a single or multi-mode cavity. The resistive load 110 may be selected from a variety of commercially-available units or can be custom fabricated using an electromagnetic energy-absorbing material.

In the illustrated embodiments, the reaction vessel 104 is designed to contain a chosen quantity of sample. The preferred form of sample includes powdered solid, semi-solid, or liquid forms. It is also contemplated that one may expose small quantities of a liquid sample to microwave energy by distributing the liquid sample upon solid supports such as filter paper, adsorbents, or powders which are then placed in the reaction vessel 104.

In certain applications, the reaction vessel 104 is preferably constructed to allow the operator to manipulate the reaction vessel 104 such that a quantity of sample 103 may be deposited, injected, collected, or otherwise situated in the reaction vessel 104, and after capping the reaction vessel 104 so as to achieve a gas-tight seal of the sample 103 within the reaction vessel 104, the contents of the reaction vessel 104 may be subject to microwave energy sufficient not only to effect microwave-assisted heating but also to create a pressurized environment. That is, due to sufficient microwave-assisted heating, the internal temperature and pressure of the reaction vessel 104 may be elevated with respect to ambient conditions. Suitable reaction vessels 104 may be constructed as known in the art to withstand such treatment while maintaining the requisite seal. Furthermore, it is contemplated that a variety of sizes and shapes of reaction vessels 104 can be accommodated by appropriate designed of the container subassembly 105.

The reaction vessel 104 is preferably sized and shaped for easy insertion and removal from the waveguide 106 either by a manual or an automated procedure. For example, subsequent to the completion of one or more heating procedures, the contents of the reaction vessel 104 may need to be moved to another instrument so as to be subjected to further sample preparation, analysis, or synthesis procedures.

In still other embodiments of the present invention, one skilled in the art may find it useful and within the scope of this invention to modify the container subassembly 105 to function as a reaction vessel rack or similar receiver means so as to allow simultaneous exposure of more than one reaction vessel 104 to microwave energy to thereby increase the throughput of the illustrated embodiments 100, 200.

Microwave-assisted sample preparation may be improved, pursuant to the teachings herein, by way of practicing the absorbed energy monitoring procedures described herein with respect to one or more steps useful in, for example, performing headspace sampling, or in procedures for sample extraction, digestion, purification, separation, or distillation.

Although certain embodiments of the present invention have been set forth with particularity, the present invention is not limited to the embodiments disclosed. Accordingly, reference should be made to the appended claims in order to ascertain the scope of the present invention.

What is claimed is:

1. A system for monitoring the progress of a chemical reaction in a microwave-assisted preparation of a sample, comprising:

a microwave energy source for radiating a known level of microwave energy;

a waveguide having a waveguide cavity and a predetermined geometry, the waveguide being coupled to the microwave energy source for receiving said radiated microwave energy;

a reaction vessel for containing the sample; and a resistive load coupled to the waveguide;

wherein the waveguide geometry is constructed to position the reaction vessel in the path of the forward microwave radiation between the microwave energy source and the resistive load; and an energy monitoring device interposed between the reaction vessel and the resistive load so as to monitor the energy directed to the resistive load;

whereby the energy absorbed by the sample may be calculated in accordance with the level of energy measured by the energy monitoring device to provide a value that indicates the status of the chemical reaction.

2. A system for monitoring the progress of a chemical reaction in a microwave-assisted preparation of a sample, comprising:

a microwave energy source for radiating a known level of microwave energy;

a waveguide having a waveguide cavity and a predetermined geometry, the waveguide being coupled to the microwave energy source for receiving said radiated microwave energy;

a reaction vessel for containing the sample;

a container subassembly located in the waveguide cavity for receiving the reaction vessel and for locating the reaction vessel within the waveguide cavity at a predetermined position in the path of the forward microwave radiation between the microwave energy source and a terminal end of the waveguide;

an isolator provided in the form of a circulator coupled to the resistive load located at a predetermined position in the path of the forward microwave radiation between the microwave energy source and the reaction vessel so as to allow the forward energy generated by the energy source to proceed to the sample, and divert reverse energy to the resistive load; and means for monitoring forward energy and reverse energy levels in the waveguide;

wherein the energy absorbed by the sample may be calculated in accordance with the difference in the levels of energy respectively measured by the forward energy and reverse energy monitoring devices to provide a value that indicates the status of the chemical reaction.

* * * * *